R. A. KOEPKE.
SHOE TOE SOFTENING MACHINE.
APPLICATION FILED OCT. 12, 1921.
1,425,981.
Patented Aug. 15, 1922.
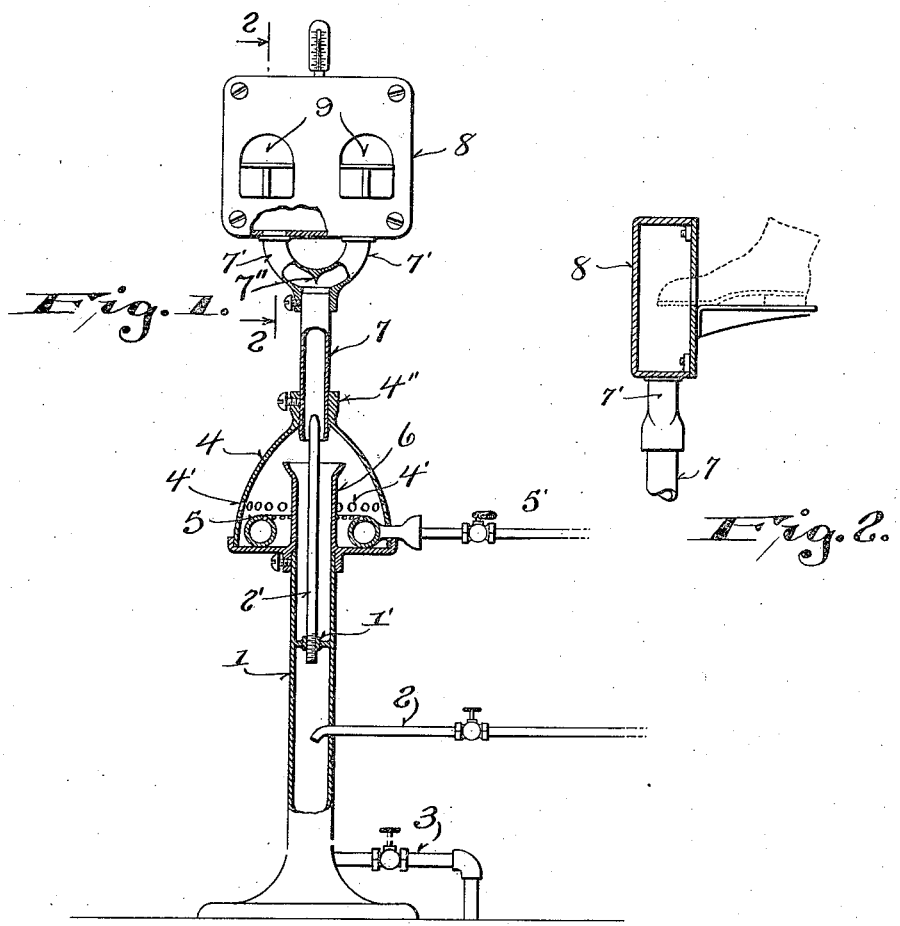

UNITED STATES PATENT OFFICE.

RICHARD AUGUST KOEPKE, OF MILWAUKEE, WISCONSIN.

SHOE-TOE-SOFTENING MACHINE.

1,425,981.   Specification of Letters Patent.   Patented Aug. 15, 1922.

Application filed October 12, 1921. Serial No. 507,327.

*To all whom it may concern:*

Be it known that I, RICHARD AUGUST KOEPKE, a citizen of the United States, and resident of Milwaukee, in the county of Milwaukee and State of Wisconsin, have invented certain new and useful Improvements in Shoe-Toe-Softening Machines; and I do hereby declare that the following is a full, clear, and exact description thereof.

My invention refers to softening devices for shoe tips or the like.

The primary object of my invention is to provide a simple, economical and effective softening device for shoe tips wherein a controlled constant volume of steam from a source of supply is delivered to a dome, and prior to such delivery the steam is first indirectly superheated and thereafter mixed with a predetermined volume of hot air, to thus effectually soften shoe tips and avoid discoloration. The construction and arrangement of the device is such that the temperature of the hot air is controlled and the proportions of hot air and steam are controlled independently; it being within the scope of my invention to employ dry steam only or hot air only under certain conditions.

I am aware of the fact that various devices have been developed for the purpose of softening shoe tips. In some instances an open pot for developing steam vapor has been utilized in connection with some means for indirectly drying the vapor. In this type of structure, however, the rising vapor, owing to the open pot, is limited both as to volume and temperature and the indirect heat to which the vapor is subjected will only serve to dry the vapor without adding volume thereto. Hence in open pot structures of this general type, the moist fluid, as a whole, is developed slowly, whereby, in many cases, unsufficient volume is obtained.

Another disadvantage of this device is, that under certain conditions, the shoe tips will be stained, for the reason that the indirect method of drying the steam is not sufficient, in all cases, bearing in mind that said steam so developed is caused to travel in a lazy zig zag flow more or less.

A further objectionable feature in the type which I have mentioned is, that, when it is desired to use hot air solely, the supply of hot air would be insufficient, due to the fact that the only source of supply of fresh air is from the steam generating pot.

Specific objects of my invention are to provide a dome having a column for its support, in which column there is located a steam pipe, means for taking care of condensation, means for introducing hot air to the steam pipe, whereby the temperature of the steam is raised, and means for thereafter introducing hot air in the desired quantity directly to the steam jet prior to its delivery to the dome.

Another object of my invention is to provide an arrangement and construction wherein the steam jet serves as an injector in connection with an air chamber, whereby a predetermined quantity of air is forcibly drawn into said chamber.

Another object of my invention is to provide a housing in connection with the air chamber, and surrounding the steam pipe, whereby condensation from the dome and other parts at a higher elevation is trapped.

With the above and other objects in view, the invention consists in certain peculiarities of construction and combination of parts as are hereinafter set forth with reference to the accompanying drawings and subsequently claimed.

In the drawings,

Figure 1 represents a front elevation of a shoe tip softening device embodying the features of my invention, with parts broken away and parts in section to more clearly illustrate the details of construction, and Figure 2, a detailed cross section through the dome portion of the device, showing means for introducing and supporting a shoe in connection with the dome, whereby the tip is subjected to the desired flow of fluid.

Referring by characters to the drawings, 1 represents a hollow base column constituting a steam dome, having fitted therein a valve controlled live steam pipe 2 which leads to any suitable source of constant supply. The column is also fitted with a valve controlled drain pipe 3 at or near its bottom portion for the purpose of draining off water of condensation. A transverse web 1' formed in the column has secured thereto, a steam discharge pipe or nozzle 2'. Secured to the upper end of the base column is a housing 4, which housing constitutes a super-heating chamber. The housing has fitted therein, any suitable type of heating unit 5, that illustrated being in the form of a standard gas burner head, which head is provided with the usual fuel gas supply pipe 5'. The superheating chamber of the housing is also formed with a plurality of air intake ports 4', which ports are located above the burner head 5.

Obviously I may, in some instances, utilize a damper mechanism for varying the capacity of air intake ports, if desired, whereby the volume of fresh air introduced above the heating unit may be controlled. The steam discharge nozzle 2' within the housing 4 is surrounded by a tubular shell 6, which shell terminates with a bell shaped mouth near the upper portion of the housing, it being understood that said upper portion is preferably contracted about the mouth of the shell.

The housing terminates with a coupling nipple 4'' for the reception of a mixing pipe 7, the lower end of which mixing pipe is slightly contracted, as shown, and spaced a predetermined distance above the cupped mouth of the tubular shell, it being understood, as shown, that the discharge nozzle 2' terminates at a point above the contracted lower end of said mixing pipe. The mixing pipe is branched at its upper end to form a pair of delivery channels 7', which channels communicate with the bottom of an enlarged dome 8. The dome is provided with shoe tip receiving apertures 9 in one wall thereof and suitable means for supporting the shoe, as best illustrated in Figure 2.

It is understood that the dome may be provided with a suitable thermometer, whereby the temperature of the vapor or hot air is determined.

When it is desired to soften the tips of boots and shoes, in this exemplification of my invention, a pair of them may be adjusted to the apertures 9, whereby the tips will extend into the dome. Live steam is then introduced into the discharge nozzle. The heating unit 5, being in operation, will develop the desired temperature within the housing 4, and the steam jet which is discharged from the nozzle will thus create a suction, whereby fresh air will be drawn through the port of the housing to thus develop a volume of hot air that will surround the tubular shell and come in contact with the surface of nozzle 2' as it rises, whereby the steam is superheated before it is discharged from the nozzle.

This superheating effect upon the steam is also developed within the tubular shell 6. Hence the heated air will be drawn into the mixing pipe 7 and co-mingle with the live steam discharged from the mouth of the nozzle, whereby said steam can be predeterminately regulated as to moisture and volume and, at the same time, it is mixed with pure hot air. The vapor is then discharged through the branch pipe 7' into the dome, whereby the proper softening effect upon the tips of the shoes will result.

A machine of this type is in practical operation and after many tests, the result of the mixed vapor has shown, conclusively that the leather subjected thereto is not discolored but softened to the desired degree, it being understood that the vapor mixture is varied indefinitely under the control mentioned for different varieties of leather.

It has also been found, in some instances, that the desired result can be obtained by utilizing the hot air only or the steam only, but under ordinary conditions a mixture, or combination of both, has proven satisfactory.

As shown, the branch pipes 7' are formed with a depending deflector 7'', which is in axial line with the pipe 7, whereby the vapor is divided uniformly and discharged into said branch pipe as it rises from the nozzle.

While I have shown and described a machine for carrying out my invention minutely as to detail, it is understood that I may vary the structural features indefinitely within the scope of the claims as they will be hereafter understood by those skilled in the art of building such softening machines or devices.

I claim:

1. A shoe tip softening device comprising a dome having apertures therein for the reception of shoes, a mixing pipe in communication with the dome, a live steam pipe extending into the mixing pipe, a superheating chamber in communication with the mixing pipe and encasing the steam pipe, the superheating chamber being provided with air intake ports, and means for heating the chamber, whereby a volume of hot air is caused to travel upwardly about the steam pipe and mingle with the live steam discharged therefrom.

2. A shoe tip softening device comprising a dome having apertures therein for the reception of shoes to be operated upon, a mixing pipe in communication with the dome, a live steam pipe in communication with the mixing pipe, a superheating chamber surrounding the live steam pipe and in communication with the mixing pipe, the superheating chamber being provided with air intake ports, a heating unit associated with the aforesaid heating chamber, and means extending into the superheating chamber and surrounding the steam pipe nozzle for trapping condensed steam from the dome and associated parts thereabove.

3. A shoe tip softening device comprising a dome having apertures therein for the reception of shoes, a mixing pipe in communication with the dome, a live steam pipe extending into the mixing pipe, a heating chamber in communication with the mixing pipe and encasing the steam pipe, the superheating chamber being provided with air intake ports, means for heating the superheating chamber, whereby a volume of hot air is caused to travel upwardly above the steam pipe and mingle with the live steam discharged therefrom, and means for controlling the constant supply of steam and for regulating the heating unit associated with the superheating chamber, whereby hot air may be used or live steam independently.

In testimony that I claim the foregoing I have hereunto set my hand at Milwaukee, in the county of Milwaukee and State of Wisconsin.

RICHARD AUGUST KOEPKE.